Sept. 20, 1966

J. J. RENDOS ET AL 3,273,379

METHOD OF LOCATING LEAKS

Filed Sept. 17, 1963

INVENTORS
ROBERT R. BANKS
JOHN J. RENDOS
BY
Jonathan Plaut
ATTORNEY

United States Patent Office 3,273,379
Patented Sept. 20, 1966

3,273,379
METHOD OF LOCATING LEAKS
John J. Rendos, Millington, and Robert R. Banks, Berkeley Heights, N.J., assignors to Air Reduction Company, Incorporated, New York, N.Y., a corporation of New York
Filed Sept. 17, 1963, Ser. No. 309,503
10 Claims. (Cl. 73—40.7)

This invention relates to a method of leak detection in an enclosure through which a gas stream which is decreasing in temperature moves.

More particularly, this invention relates to a method for determining the existence and location of a point of leak in a particular pass of heat exchange apparatus, without the necessity of dismantling a substantial portion of the heat exchange apparatus or stopping operation of the apparatus for a significant period of time.

More particularly, this invention relates to the introduction of various forms of a condensible tracer material into the path of one pass of a leaking heat exchange apparatus in order to determine the existence and the location of the point of leak in that particular pass, as a result of examination of the stream in the adjacent pass of said exchanger.

In one embodiment, this invention relates to the introduction of various forms of Freon fluorocarbons into the path of one pass of leaking heat exchange apparatus, in order to determine the existence and the location of the point of leak in that particular pass.

The development of leaks in heat exchange apparatus is a serious problem. Adjacent passes of heat exchange apparatus carry streams under pressure of different temperature with heat transfer effected therebetween. Normally, there are a series of adjacent passes in heat exchange apparatus. Heat transfer takes place from a warmer stream to the cooler adjacent stream, thus resulting in a loss of heat by said warmer stream. The use of heat exchange apparatus is essential in the air separation process, as well as in many other and varied processes. It is both desirable and essential that the passes of heat exchange apparatus be fluid tight. When a point of leak is present between two passes of heat exchange apparatus, there is an intermixture of the cooler stream and the warmer stream. Efficient operation of the heat exchange apparatus is therefore seriously impaired.

Various procedures and materials for detecting and locating points of leak in heat exchange apparatus have been proposed and tried but none have proven practicable from the dual viewpoints of economy and satisfactory results. According to one method commonly used when it is suspected that a leak exists, the operation in which the heat exchange apparatus functions is halted and the various sections and/or passes of the heat exchange apparatus are removed from their positions in the operation and tested (often by a pressure test) to discover (1) whether there is a leak in that particular section or pass and then (2) the location of the point of the leak. Repair or replacement of the leaking pass or section of the pass or re-routing of the flow of the streams so as to by-pass the leaking pass is then effected. The stopping of the operation in which the leaking pass is a part, and the often required dismantling of at least a portion of said leaking pass is uneconomic since it is nonproductive. The stopping down time may be of relatively long duration, since it includes the time taken to determine the approximate location of the point of the leak. The dismantling may include dismantling of passes found not to leak, which is extremely wasteful of time and manpower.

It is the object of this invention to provide a method for detecting the existence and location of a point of leak in an enclosure through which a gas stream of decreasing temperature moves.

It is further an object of this invention to provide an economic and dependable method for determining the existence and location of a point of leak in heat exchange apparatus.

It is further an object of this invention to provide a method for locating the approximate point of leak between adjacent passes of heat exchange apparatus without the necessity of dismantling a significant part of the heat exchange apparatus or stopping production for a substantial period of time.

It is further an object of this invention to provide a method for determining the existence and approximate location of a point of leak between adjacent passes of heat exchange apparatus, in which method substantial equipment is not required.

It is further an object of this invention to provide a method of determining the existence and location of a point of leak in the path of a pass of heat exchange apparatus, wherein the passes of multiple pass heat exchange apparatus may be tested without dismantling the exchanger or stopping down production for a substantial period of time.

These and other objects, as well as other advantages and benefits, of this invention will become apparent upon the study of the following details of the invention.

The term heat exchange apparatus in its most basic form refers to apparatus in which heat is transmitted from one fluid to another. The two fluids are generally moving under pressure and contained in adjacent longitudinally extending enclosures with the heat transferred from one fluid to the other through the wall separating the two.

The term multiple pass heat exchange apparatus refers to heat exchange apparatus with banks of heat exchange passes arranged in a series or parallel relationship.

According to this invention, various selected condensible tracer materials, each material having a different freezing point, are introduced, preferably successively (one at a time), into the moving stream found in the path of the pass of heat exchange apparatus to be tested to determine the existence and location of a point of leak. The heat exchange apparatus commonly is a multiple pass apparatus. The pass of the heat exchanger into which each of the tracer materials are introduced is one in which the moving stream therein is giving up heat, and thus decreasing in temperature. The various tracer materials are introduced, one at a time, into the moving stream as testing proceeds. The stream in the pass adjacent to the first-mentioned pass is examined for evidence of each of the tracer materials introduced. If there is a leak in the pass tested and the point of leak is at a point warmer than the freezing point of a particular tracer material introduced, liquid and/or concentrated vapor will be carried through the leak and high concentration of that tracer material will be detected in the stream of the adjacent pass. If the leak is in a colder section, below the freezing point of that particular tracer material referred to in the preceding sentence, at most, only vapor evidence of the tracer material will be carried through the point of leak, and often no detectible evidence of the tracer material will be carried through the point of leak, resulting in a lower concentration of that tracer material than in the example of the preceding sentence being detected in the pass. The condensible tracer material introduced will not flow through the point of leak if the leak is at a point below the freezing point of said tracer material for the particular pressure of the stream in the pass, since it normally will freeze out of the flow of the moving stream. A second tracer material with a different freezing point is then introduced into the stream moving in the path of the first pass as suggested above. Detection of the second tracer material in the adjacent stream is once again undertaken. This procedure is repeated until, with the information supplied by the standard appropriate vapor pressure curve, as later more fully discussed, the approximate temperature at the point where the leakage occurs is determined. Upon determining the approximate temperature at the point of leak, the point of leak can be approximated as a result of knowing the temperature of the stream (which is decreasing in temperature) at various points as it moves through the pass of the heat exchange apparatus.

Instead of introducing the various tracer materials, one at a time, said materials may be introduced in a group, all at once, into the stream of decreasing temperature, with detection of each material in the stream of the adjacent pass and analysis of the location of the point of leak being the same as discussed in the preceding paragraph. Alternatively, groups of tracer materials, each group containing any desired number of tracer materials, may be introduced successively into the stream of decreasing temperature with detection and analysis of the point of leak proceeding in the manner discussed in the preceding paragraph.

The determination of the approximate temperature at the point of leak by the introduction of different tracer materials (each with different freezing temperatures) allows for the location of the leak to be closely approximated. Not only can the location of the point of leak in a particular pass be determined as a result of the introduction of various tracer materials into said pass, as set forth in the two preceding paragraphs, but in a multiple pass heat exchanger the particular pass in which the leak is occurring can be rapidly identified (since the cooling stream progresses through each succeeding pass at a lower temperature and general approximation of the temperature at the point of leak is all that is necessary to determine which pass contains the leak). Upon discovery of the approximate location of the leak in a multiple pass exchanger, use of the particular pass determined to contain the point of leak in the multiple pass exchanger may be discontinued, and avoidance of said pass or repair or replacement of the particular section of the pass where the leak is located (after locating said particular section which contains the point of leak by the method of this invention) may be undertaken as desired. If a multiple pass exchanger has been involved, the location of the leak can be determined according to this invention without shutdown of the process of dismantling of heat exchange passes that would be found not to contain the point of leak. Whether a multiple pass or a single pass heat exchanger is involved, approximate location of the point of leak may be effected by the method of this invention.

In an embodiment of the invention, each of the condensible tracer materials is selected from the family of Freon fluorocarbons and introduced into the moving stream in the path of the pass suspected of containing the point of leak, said stream decreasing in temperature. The method of determining the location of the point of leak in the heat exchange apparatus when using various forms of Freon fluorocarbons is as set forth in the preceding paragraphs.

In the drawing:

FIGURE 1 shows, in simplified form, a top view of multiple pass heat exchange apparatus with only a pair of adjacent passes shown, which is merely exemplary of one type of heat exchanger in which the method of this invention may be used, not meant to limit the application of the method of this invention to other types of heat exchange apparatus.

FIGURE 2 shows a standard (prototype) vapor pressure curve.

The heat exchange apparatus shown generally at 1 has adjacent passes 2 and 3 in exchanger units 4, 5 and 6. Streams move through the passes in the direction shown. The passes 2 and 3 of the units 4, 5 and 6 are interconnected by the usual conduit structure (not shown). The exchanger units 4, 5 and 6 are shown arranged in series. Of course, such arrangement may be varied in any manner preferred and is not a part of this invention. Many exchangers actually used have more than two (adjacent) passes, but for simplicity of illustration, only two are shown. As earlier discussed, the method that is the subject matter of this invention can be used where only a single pair of passes comprise the entire heat exchange unit. Furthermore, the method of this invention is of great advantage when employed to determine the existence and location of a leak in a multiple pass exchanger.

The terms "exchanger" or "heat exchange apparatus" do not limit the application of the method of this invention. The method proposed is adaptable to any apparatus in which there are at least two paths in heat transfer relationship, for example, regenerators.

If it is suspected that a leak exists between the pass 2 and the pass 3 of the heat exchange apparatus 1, different forms of a condensible tracer material (such as various forms of Freon fluorocarbons in one embodiment), or entirely different condensible tracer materials not of the same family, are introduced at successive intervals into the path of the pass with the moving stream which is under pressure and which is decreasing in temperature (the stream through passes 3 in the embodiment shown). As stated earlier in this disclosure, the condensible tracer materials may be introduced successively and one at a time as just indicated, all at once or in groups, which are introduced successively. The description in relation to the drawings will be continued with respect to introduction of the tracer materials into the stream of decreasing temperature successively and one at a time. However, as earlier discussed, the detection and analyzing of the point of leak where the tracer materials are introduced all at once or in groups would be the same as discussed with relation to one-at-a-time introduction. The temperature in pass 3 will be getting colder as the tracer material progresses from A to B to C to D to E to F, in the direction of the arrow of flow. As a result of examination of vapor pressure curves for each form introduced, the freezing point of each form of the particular tracer material introduced may be determined (for the pressure found in the stream of the pass) and by knowing the temperature at points along the line of flow in pass 3, the particular section (4, 5 or 6) in which the point of leak occurs can be readily approximated. This approximation of location so as to determine the section (4, 5 or 6) in which the point of leak occurs can be accomplished by detecting the concentration in pass 2 of the tracer material introduced into pass 3, comparing that result with the concentration in pass 2 detected upon the introduction into pass 3 of a tracing material of different freezing temperature, and then by repeating with other tracer materials until the approximate temperature at the point where the leak occurs is determined. If the leak is past the point at which a particular form of a tracing material will freeze, because the temperature of the stream in the pass 3 has cooled at the point of leak below the freezing temperature of that particular form, then only vapor will be carried through the leak and a low concentration of the tracing material will be detected in the stream of pass 2. If a form of the tracer material is then used which has a low freezing temperature, such that at the point of the leak the temperature of the stream in the pass 3 is above the freezing temperature of the tracer material, then liquid and/or concentrated vapor will be carried through the leak and a higher concentration of tracer material will be detected in the stream of pass 2 than when using the form of tracer material in the preceding sentence.

Examination of the standard vapor pressure curve shown in FIGURE 2 shows that for a particular pressure and a particular temperature, one can predict what form (solid, liquid or vapor) a particular tracer material introduced will take, as is well understood by those versed in the art. The mark H indicates the "triple point," or pressure and temperature at which the substance will exist in a state of equilibrium, that is in all three states. Line G–H is the freezing point line from liquid to solid; the temperature varies slightly with pressure along this extent. A curve of the type shown will exist for each of the tracer materials introduced. The approximate temperature at the point of leak may be predicted with greater and greater accuracy as the successive tracer material forms are introduced by knowing the pressure of the moving stream in the first pass and the results of the analysis of the second stream, since the concentration of the tracer material in the second stream will indicate in what form the form of the tracer material passed through the point of leak, which indicates a particular temperature range at a particular pressure on the vapor pressure curve.

With the detection results obtained as outlined above, a knowledge of the temperature characteristics of the forms of the tracer material used, and a knowledge of the temperatures of the stream along pass 3, approximation of the point of leak may be made. Repetition of the above method of detection using, in succession, various forms of the tracing material, each having a different freezing temperature, will result in a close approximation of the point of leak.

After the particular section 4, 5 or 6 is determined to contain the point of leak, the same method of testing may be employed to determine the location within the section of the leak.

The presence of the tracer material in the stream of the second pass (2 in the illustrative drawing) may be determined by the use of a standard leak detector, such as the GE type H–2 detector.

In one application of the method set forth, a particular multiple pass heat exchange apparatus was tested in order to verify the presence and determine the approximate location of the point of a leak. Freon fluorocarbons 22, 11, 113 and 114 were introduced at successive intervals into the moving stream of one pass, which stream was decreasing in temperature, of heat exchange apparatus, the stream being a nitrogen stream. A GE type H–2 detector was inserted into a second pass, an adjacent pass, of the heat exchange apparatus. The second pass carried an oxygen stream and the detector was capable of determining the presence of Freon fluorocarbons in the oxygen stream. Freon fluorocarbons 22 and 11 passed through the leak in high concentration and were detected. Freon fluorocarbons 113 and 114 were of much lower concentration in the stream of the second pass and detection was minimal. Below the following temperatures the Freon fluorocarbons utilized in the application of the method set forth freeze to a solid state, as determined from the vapor pressure curve.

|      | ° F. |
|------|------|
| F11  | −168 |
| F22  | −256 |
| F113 | −31  |
| F114 | −137 |

As a result of examination of the vapor pressure curve for the Freon fluorocarbons introduced, in order to determine the freezing points as discussed above, with the test results as to which types of Freon fluorocarbons were detected in high concentration in the stream of the second pass as compared to which types of Freon fluorocarbons were detected in much lower concentration, the temperature at the point of leak was approximated. From this temperature approximation, the approximate position of the leak was determined, and thus the particular pass containing the point of leak was isolated. Repetition of the steps of the test will secure a more and more specific approximation as to the location of the point of leak.

The method for determining the existence and location of a point of leak which is the subject matter of this invention may be employed wherever (1) an enclosed moving gas stream is cooling and (2) the area adjacent the point of leak in the enclosure is confined, so that it may be examined for the tracer material introduced into the moving gas stream. The minuteness of size of the point of leak which may be detected by use of the method of this invention will be limited by the tracer materials chosen, the pressure in the path of the pass of decreasing temperature, and the detector or other apparatus of analysis used.

The method contained herein is not limited to the use of Freon fluorocarbon tracer material or any other particular tracer material, but rather may include the use of other desired tracer materials, such as other hydrocarbons, nitrous oxide, or sulfur dioxide. Likewise, the method which is the subject matter of this invention is not limited to any particular type of heat exchange unit.

The method of testing for the location of a point of leak in a heat exchanger apparatus set forth above is advantageous since it is simple, accurate, does not require substantial equipment, and does not require substantial dismantling of the heat exchange apparatus or extensive shutdown of the process employing the leaking heat exchange unit.

It is within the purview of my invention to utilize the method for testing for the location of point of leak described above at temperatures above atmospheric temperature. The temperature of the stream which is decreasing in temperature is a factor in the choice of the tracer material to be utilized.

While an illustrative method has been described herein, it will be understood that the invention is not limited to that illustrative method and that numerous changes may be made without departing from the general principles and scope of the invention. It is to be understood that other methods might be adopted as may come within the scope of the claims that follow without departing from our invention.

We claim:

1. A method for determining the existence and approximate location of a point of leak between adjacent passes of heat exchange apparatus, each having a direction of flow, comprising the steps of introducing condensible tracer materials having respectively different freezing points along the path of one pass of the heat exchange apparatus, said path being one of decreasing temperature along the direction of flow, conducting a stream through the adjacent pass, and analyzing said stream for traces of said condensible tracer materials.

2. A method for determining the existence and approximate location of a point of leak between adjacent passes of heat exchange apparatus, each having a direction of flow, comprising the steps of introducing Freon fluorocarbons having respectively different freezing points along the path of one pass of the heat exchange apparatus, said path being one of decreasing temperature along the direction of flow, conducting a stream through the adjacent pass, and analyzing said stream for traces of said Freon fluorocarbons.

3. A method for use with a stream moving in an enclosed path with an enclosed area adjacent said enclosed path, comprising the steps of introducing into said stream various forms, having respectively different freezing points, of a condensible tracer material, the temperature along said path decreasing in the direction of flow of the stream, providing a stream in the enclosed area, and analyzing the second mentioned stream for traces of said various forms of said condensible material, in order to determine the existence and location of a point of leak between the enclosed path and the enclosed area as a function of the tempearture gradient in said path in relation to the state of each of the various forms of the condensible tracer material introduced at tempeartures within the range of that temperature gradient.

4. A method for use with a stream moving in an enclosed path with an enclosed area adjacent said enclosed path, comprising the steps of introducing into said stream various forms, having respectively different freezing points, of Freon fluorocarbons, the temperature along said path decreasing in the direction of flow of the stream providing a stream in the enclosed area, and analyzing the second mentioned stream for traces of said various forms of said Freon fluorocarbons, in order to determine the existence and location of a point of leak between the enclosed path and the enclosed area as a function of the temperature gradient in said path in relation to the state of each of the various forms of the fluorocarbons introduced at temperatures within the range of that temperature gradient.

5. A method for determining the existence and approximate location of a point of leak between adjacent passes of heat exchange apparatus, comprising the steps of introducing a condensible tracer material having a particular freezing point into a stream flowing along the path of one pass of the heat exchange apparatus, said stream along its direction of flow losing heat and thus decreasing in temperature, conducting a stream through the path of the adjacent pass, analyzing said second mentioned stream for traces of said condensible tracer material, introducing a second condensible tracer material having a freezing point differing from the freezing point of the first mentioned tracer material into said first mentioned stream, analyzing said second mentioned stream for traces of said second condensible tracer material, introducing in succession, further condensible tracer materials into said first mentioned stream, each with a different freezing temperature than previously used in the method, and analyzing said second mentioned stream for traces of each of said condensible tracer materials, said existence and location of a point of leak between said adjacent passes being determined as a function of the temperature gradient in said first mentioned pass in relation to the state of each of the various forms of the condensible tracer materials introduced at temperatures within the range of that temperature gradient.

6. In the method as set forth in claim 5, selecting each of said condensible tracer materials from the family of Freon fluorocarbons.

7. In the method set forth in claim 6, analyzing said second mentioned stream for traces of each of the Freon fluorocarbons by use of a detector.

8. A method for determining the existence and location of the point of leak between adjacent passes of heat exchange apparatus comprising the steps of introducing at successive intervals condensible tracer materials having respectively different freezing points into a stream flowing, under pressure, in the path of one pass of said heat exchange apparatus, said stream losing heat along its direction of flow and thus decreasing in temperature, conducting a second stream through the path of the adjacent pass, and analyzing said second mentioned stream for traces of each of said condensible tracer materials, the existence and location of a leak between said adjacent passes being determined as a function of the temperature gradient in said first mentioned pass, in relation to the state of each of the tracer materials introduced at temperatures within the range of that temperature gradient.

9. In the method set forth in claim 8, selecting each of the condensible tracer materials from the family of Freon fluorocarbons.

10. In the method set forth in claim 8, analyzing said second mentioned fluid for traces of each of the Freon fluorocarbons by use of a detector.

No references cited.

LOUIS R. PRINCE, *Primary Examiner.*